INVENTOR
SALIMUZZAMAN SIDDIQUI

$$\text{United States Patent Office}$$

3,047,563
Patented July 31, 1962

3,047,563
RAUWOLFIA ALKALOIDAL COMPLEXES AND PROCESS FOR ISOLATING THE SAME FROM RAUWOLFIA PLANT MATERIAL
Salimuzzaman Siddiqui, % Pakistan Council of Scientific and Industrial Research, Karachi, Pakistan
Filed Sept. 3, 1958, Ser. No. 758,714
10 Claims. (Cl. 260—236)

This invention relates to new Rauwolfia alkaloidal complexes and to a process for isolating the same from Rauwolfia plant materials.

S. Siddiqui and R. H. Siddiqui for the first time isolated a series of crystalline bases from the roots of *Rauwolfia serpentina*, Benth. [cf. J. Indian Chem. Soc., 8, 667 et seq. (1931)]. These bases, which were named as ajmaline, ajmalinine, ajmalicine, serpentine and serpentinine, were separated from the total alkaloids obtained from dried, ground Rauwolfia roots principally on the basis of differences in their basic strength on the one hand, and of solubilities of the hydrochlorides on the other.

In the known processes described in the aforesaid publication for isolating chiefly crystalline alkaloidal substances from dried plant material of Rauwolfia such as *Rauwolfia serpentina*, Benth., the dried and powdered root material is percolated several times with alcohol, and the latter is then distilled off from the combined percolates under reduced pressure below 50° C., till a thick greenish brown liquid is left behind. On complete removal of the solvent a semi-solid bitter extract is obtained. The crude extract is shaken out repeatedly with petroleum ether and then carefully concentrated further in vacuo till nearly all the solvent is removed. The light brown semi-solid extract is first treated with ammonia and then with caustic soda and extracted each time to exhaustion with ether containing a little alcohol. The alcoholic extract of the roots is thus subdivided into four fractions, the two middle, ethereal fractions constituting chiefly the alkaloidal factors while the petroleum ether fraction and the final residue contain the non alkaloidal factors.

The two ethereal solutions obtained on exhaustively extracting the semi-solid alcoholic extract after treatment with ammonia and then with alkali were worked up for the separation of various alkaloids, as described.

Later, in 1939, S. Siddiqui further reported the isolation of a weakly basic crystalline alkaloid from the neutral fraction of the alcoholic extract of the roots melting at 234° C. [cf. J. Indian Chem. Soc., 16, 421 (1939)]. In 1952 Schlittler et al. reported the isolation or reserpine, also from the acid-insoluble neutral fraction of the alcoholic extracts of the roots [cf. Experent, 8, 338 (1952)], and in the following years a number of other bases from the roots of *Rauwolfia serpentina*, Benth., were isolated. All these various isolation processes such as described, for instance, by Schlittler et al. [Helv. Chim. Acta, vol. 37, pp. 1912-20 (1954)], and by Klohs et al. [Journ. Am. Chem. Soc., vol. 76, pp. 1332–4 (1954)], use the above outlined basic process of S. Siddiqui and R. H. Siddiqui and lead to the production of individual alkaloids by extraction in which the natural conditions of alcoholic Rauwolfia concentrates are changed to pH values either in the acidic or the alkaline range as may be required to achieve the isolation of the various individual alkaloids.

It must be borne in mind that the isolation of the individual alkaloids would necessarily lead to the destruction of large complexes in which the individual alkaloids are presumably structural elements, bonded together by coordinative inks.

The resolution of these complexes would obviously have a great influence on the pharmacological action of the resulting products.

In this connection it may be mentioned that on the pharmacological side Chopra et al. showed the blood pressure reducing properties of the total Rauwolfia alkaloids [cf. Indian J. Med. Res., 21, 261 (1933)], but reserpine and later rescinnamine were noted to have the strongest hypotensive action among the pure crystalline alkaloids [cf. Muller, Schlittler and Bein, Experent, 8, 338 (1952); Bein, ibid, 9, 107 (1953)]. Besides the hypotensive action, however, reserpine possesses a central depressant action resulting in sedation and causing psychosis. Recently, on the clinical side paranoia states with suicidal tendencies have been observed [cf. Schroeder et al., J. Am. Med. Assn., 159, 839 (1955)]. These central secondary effects have greatly limited the use of reserpine and corresponding Rauwolfia extracts; as a result, the known Rauwolfia preparations can no longer be considered to be the ideal blood pressure reducing agents, as was thought after the earlier experiments.

It is therefore an object of my invention to separate an alkaloidal complex from Rauwolfia which has a satisfactory hypotensive activity and is free from the weaker bases and their known sedative and depressant action. On the other hand it is also a subject of my invention to obtain alkaloidal complexes mainly consisting of the weaker bases characterised by hypotensive-cum-sedative action to be used principally in the treatment of nervous disorders and mental ailments, as far as possible in their naturally occurring, lipoid-soluble form in which it is presumed that the undesirable effects characteristic of their individual components like reserpine may be reduced to a minimum.

So far as the object of isolating a hypotensive complex free from sedative action is concerned, it forms the subject matter of my copending continuation-in-part application Ser. No. 758,713, filed Sept. 3, 1958. The present application deals with the second objective, namely the isolation of the lipoid-soluble complexes mainly consisting of the weaker bases in a form in which the balanced action of their individual chemical constituents can serve to mitigate the undesirable side-effects noted in the case of reserpine.

It is also an object of my invention to provide a simple process for the isolation of lipoid-soluble complexes which can serve as a rich source material for the production of reserpine and other weaker bases belonging to this group.

My present invention is based on an altogether fresh approach to the handling of plant material from the Rauwolfia species of plants such as *Rauwolfia serpentina*, Benth., for the isolation of their constituents, and in particular avoids the unkindly and drastic treatment of such materials in the past, which involved exposure to fungal and oxidative action in the process of drying, as well as the free use of acidic and basic agents in the extraction and isolation procedures.

The process according to my invention therefore comprises a plurality of steps which comprise the following groups or stages:

(I) The steps of percolating the roots with ethanol or methanol and removing the solvent from the percolate;

(II) Partitioning the semi-solid residue between water and ethyl acetate or an organic solvent not miscible with water and having a similar range of solvent action;

(III) Removing the solvent from the ethyl acetate phase, and digesting the residue with petroleum ether, an alkaloidal complex named "ajmalexine" is obtained in the form of a petroleum ether insoluble powder, and another alkaloidal complex named "resajmaline," from the petroleum ether extract on removal of the solvent.

These steps are illustrated in the accompanying flow sheets in which.

The first stage (I) in the process according to the invention as illustrated in the flow sheets is directed to the production of a starting alcoholic extract of Rauwolfia. This extract is substantially obtained as described by S. Siddiqui and R. H. Siddiqui in 1931 supra by the percolation ($b$) of disintegration Rauwolfia plant material ($a$) with a short chain aliphatic alcohol ($c$), preferably methonal or ethanol, removal ($d$) of the alcohol solvent from the percolate by distilling the latter off, preferably under reduced pressure below 50° C. so that a thickened greenish brown highly viscous liquid or semi-solid residue remains as the starting extract ($e$).

However, while S. Siddiqui and R. H. Siddiqui used dry powdered root for this extraction step, I now prefer to use as source material the fresh undried roots chopped into small lengths and fresh undried scraped root bark of Rauwolfia species of plants, more especially of *Rauwolfia serpentina*, Benth. Freshly collected roots or root bark dried around 60° C. in a current of air or preferably in an inert gas like nitrogen and carbon dioxide, and dried powdered roots or root bark are also employed as source material.

The great advantage in working with the fresh plant material in the suggested manner lies in the fact that the cell membranes of the fresh roots act in effect as a dialyzing medium and retain a substantial portion of the non-alkaloidal ballast, and the dialyzate thus yields on removal of the solvent only about 5% of semi-solid matter on air dried basis as against 10 to 12% extractive from the alcoholic percolates of the dried powdered roots, the non-alkaloidal ballast which greatly complicates the isolation work being thus reduced by about half.

In a stage (II) as illustrated in the flow sheets the semi-solid extract (I–$e$) is partitioned ($f$) between water and a substantially neutral organic solvent which is immiscible therewith, in particular with ethyl acetate, and while the aqueous phase ($g$) is further treated, as described in detail in my copending application Ser. No. 758,713, filed of even date, according to stage (III) to be described hereinafter, the acetate phase ($h$) is freed ($d_2$) from the solvent, by distillation in vacuo below 60° C., the degree of vacuum not being critical as long as the temperature does not exceed the aforesaid limit, so that a residue ($i$) is obtained which is then digested ($j$) with petroleum ether ($k$); the digestion product is then separated ($l$) and from the resulting petroleum ether extract, the solvent is removed in the manner as described above ($d_3$) and a first alkaloidal complex is obtained which has been named "resajmaline" ($m$), while the resulting petroleum ether-insoluble powder constitutes a second alkaloidal complex which has been named "ajmalexine" ($n$).

The temperature to be observed during all operations where not otherwise indicated is room temperature ($o$).

The removal of solvents is carried out preferably in vacuo and below 60° C.

The separation steps used in this stage and in the further stages to be described hereinafter may be effected by filtration, centrifugation, decantation or similar separating steps known in the chemical art.

The insoluble ajmalexine fraction contains a basic component ($l$), which is obtained in the form of an acid-soluble cream colored powder by treating the complex ajmalexine ($k$) with a higher diluted aqueous alkaline solution or preferably with a 10% ammonia aqueous solution.

Throughout this stage (II) as well as all other stages in the process according to the invention, the pH values remain uncontrolled, so that the various constituents of the alkaloidal complexes are left undisturbed as much as possible. This is an important feature of the process according to my invention by which it is distinguished from the processes proposed in the art for isolating the individual alkaloids.

The use of ethyl acetate in this stage (II) is preferred, because it offers a number of advantages over the other neutral organic solvents having a similar range of solvent action.

Thus, use of the other above-mentioned solvents, although possible, either makes the separation of the aqueous and organic solvent layers more complicated, due to a greater tendency of the non-aqueous solvent to form an emulsion with water, or the solvent may show a tendency to resinify some of the alkaloids after prolonged contact therewith, which is the case with chloroform. If the latter is used, a more cumbersome removal of the solvent is indicated.

In the flow sheets the partition step has been illustrated as repeated twice ($a_2$ and $a_3$), while, of course it may not be repeated or repeated less or more often, depending on the amounts and concentrations involved.

Figure 8:
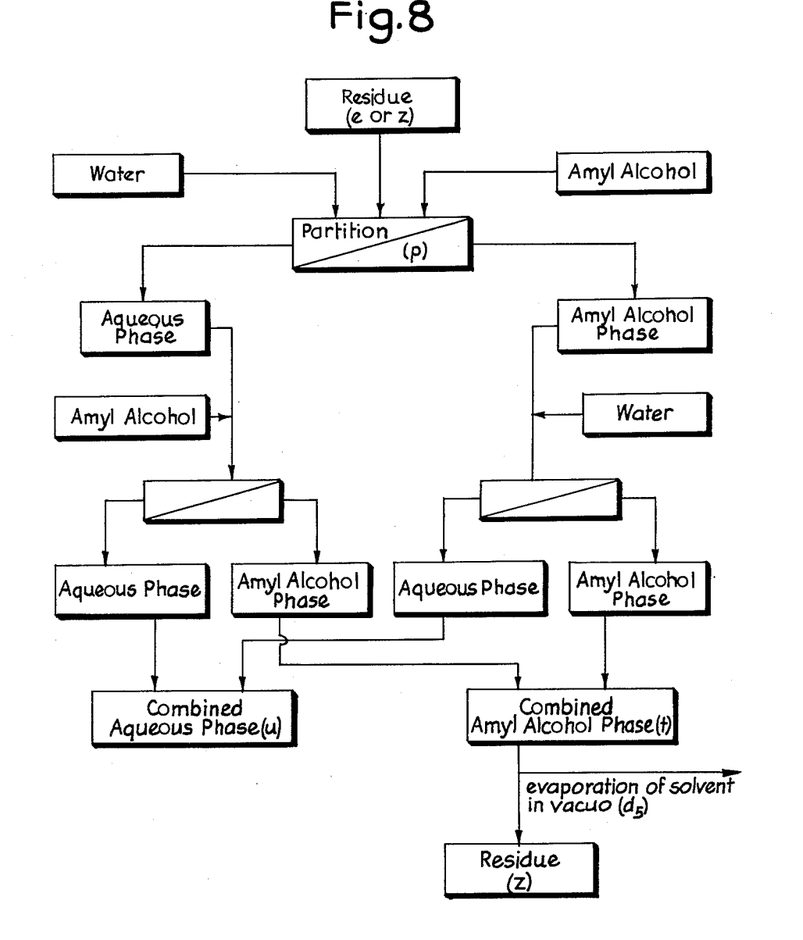
FIGURE 8 illustrates a somewhat different mode of carrying out stages (III), (IV) and (V) in combination.
Figure 9:
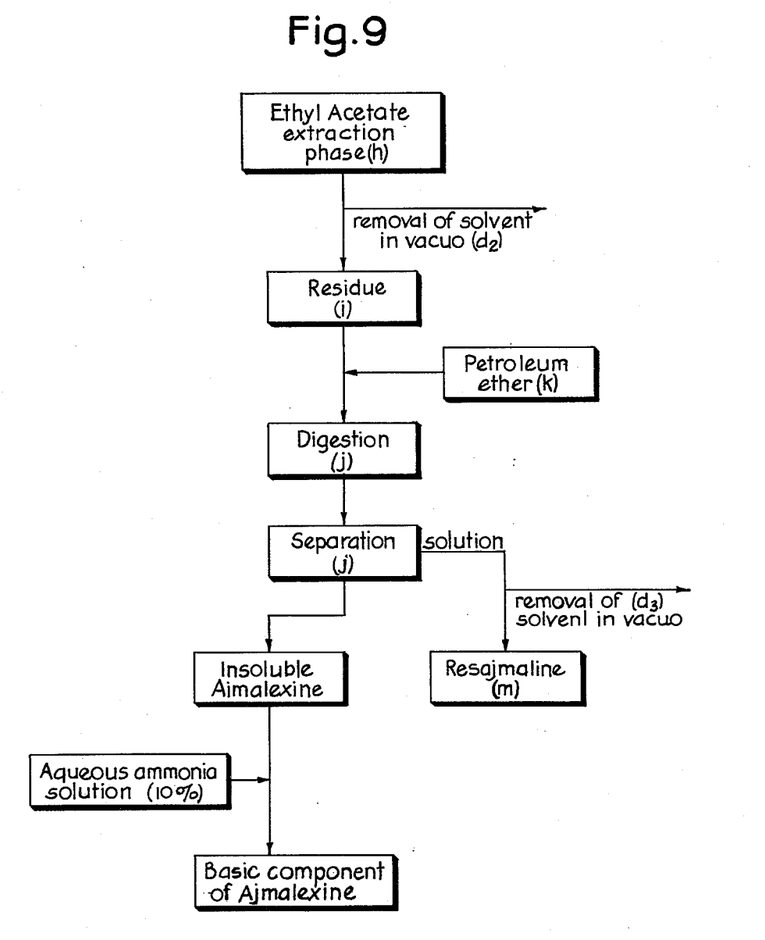

In FIGURE 8, a somewhat different procedure is illustrated in which stages (III) and (IV) are combined to obtain the combined aqueous phase ($z$) and simultaneously separately the combined amyl alcohol ($u$) of this extraction.

The extraction steps (III) and (IV) can be carried out once or repeatedly depending on the amounts and concentrations available and the yield rate up to which the plant material is to be extracted.

Figure 7:
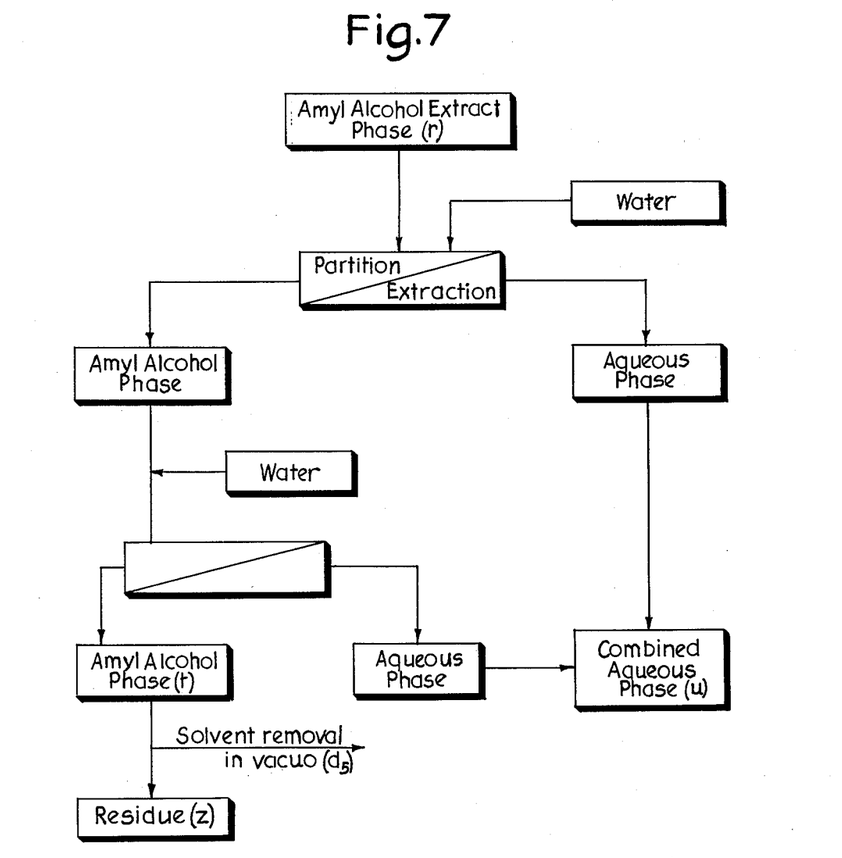
FIGURE 7 illustrates two steps of which the first (IV) is similar to that of FIGURE 6 but leading to the formation of a combined aqueous phase, while step (V) may follow step (IV) where indicated in FIGURES 1 to 3.

Step (V) illustrated in FIGURE 7 consists in a concentration ($d_5$), where necessary of the large volume of the alcoholic phase, preferably under vacuum at temperatures not exceeding 60° C.

The alkaloidal complexes isolated according to the present invention have the following characteristics:

The first alkaloidal complex, named resajmaline, mainly contains a fatty substance, serposterol, and unsaturated higher alcohols together with about 2.5% of reserpine, 0.5% of rescinnamine and some other weaker bases in a lipoid soluble form.

Resajmaline forms a greenish viscous oily liquid which is soluble in ethyl acetate, ether and petroleum ether, and fairly soluble in ethanol and methanol. Its kinematic viscosity determined by a U-tube viscometer of the British Standard Pattern [British Standard 188: 1937, incorporating amendments issued January 1940 and January 1951; published by British Standards Institution, London], at 31.5° C. is 4000 centistokes. The viscosity increases on storage.

The second alkaloidal complex, which has been designated as ajmalexine, contains a concentration of the weaker bases with 5.5% of reserpine and 2.2% of rescinnamine, but the other Rauwolfia bases also occur in this complex. It forms a light cream colored powder soluble in ethyl acetate, mostly soluble in benzene, fairly so in ethanol and methanol and insoluble in petroleum ether. After drying at 30° C. over phosphorus pentoxide for 3 hours, it shrinks and turns brown at 72° C., froths up at 110° C., and melts at 118°–120° C. The basic component of ajmalexine is obtained in the form of an acid soluble cream colored powder by treating the complex with dilute alkali preferably 10% ammonia.

The petroleum ether soluble fraction, resajmaline the recovery of which has been neglected in the processes described in the art, as well as the ajmalexine complex can both be utilized as such in therapy for their sedative or hypotensive action, or form a rich source material for the isolation of reserpine, rescrinnamine and other weaker bases.

The alkaloidal complexes may be resolved into different alkaloids with the use of extracting and purifying methods adapted to the physical and/or chemical properties of the substances.

Figures 1, 2:
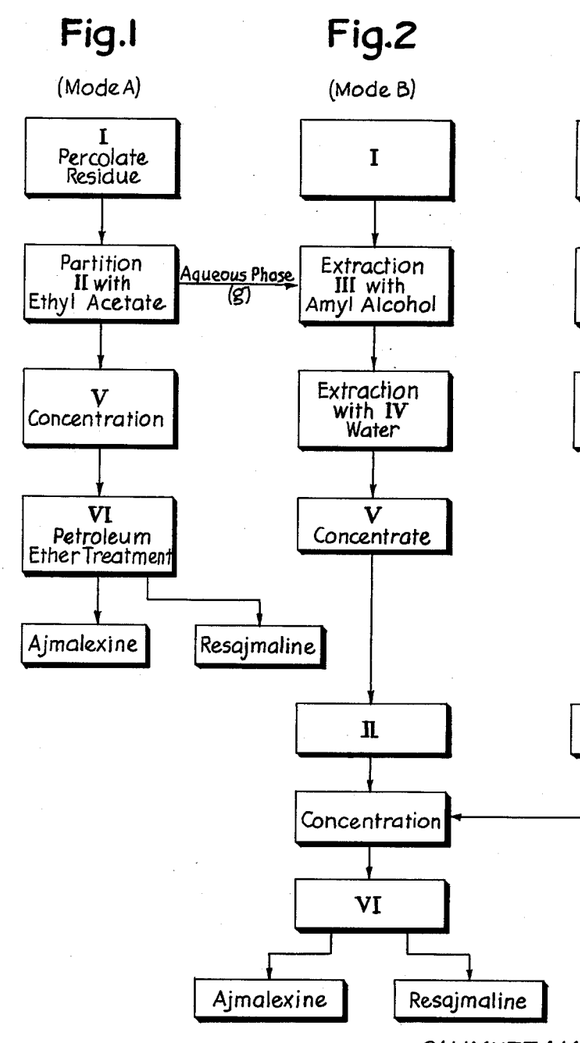
FIGURE 1 illustrates a first mode (A) of operation of the process according to the invention.
FIGURE 2 is a flow sheet illustrating another mode (B) of carrying out the process of the invention.

A preferred mode of carrying out the process according to the invention as illustrated as mode (A) in FIGURE 1 of the drawings, comprises the steps of (I) repeatedly percolating fresh undried roots chopped into 2 to 3 cm. lengths with ethanol or methanol and removing the solvent from the percolates in vacuo (II); partitioning the semi-solid residue between water and ethyl acetate; repeatedly extracting out the aqueous layer with fresh quantities of ethyl acetate whereby two clearcut fractions are obtained without leaving any insoluble residue; resajmaline and ajmalexine, which go into the ethyl acetate phase during the isolation of serpajmaline as described in my copending application, are isolated by (V) removing the solvent from the combined ethyl acetate phase; and (VI) digesting the residue with petroleum ether, whereby resajmaline is obtained on removal of the solvent from the petroleum ether extract, and ajmalexine is left undissolved in the form of a light cream colored powder.

A further quantity of the alkaloids is recovered by (III) repeatedly extracting the aqueous layer ($g$) with a hydroxylic partially water-miscible organic solvent, preferably amyl alcohol; (IV) repeatedly extracting the combined amyl alcoholic solution ($m$) with water till the aqueous extract becomes nearly devoid of color; (V) removing the solvent ($d_5$) from the combined amyl alcohol phase ($t$) in vacuo; and (VI) subjecting the residue ($z$) to the series of operations of stage (II) as described above.

Another mode (B) of carrying out the process for isolating serpajmaline, illustrated in FIGURE 2, comprises, after stage (I), the steps of (III) partitioning the residue, left after removal of the solvent from the percolates of fresh undried chopped roots, between water and amyl alcohol and repeatedly extracting the aqueous layer with further quantities of amyl alcohol to exhaustion (IV); repeatedly extracting the amyl alcoholic extracts with water; (V) removing the solvent from the amyl alcoholic solution ($r$) left after extraction with water; (II) dividing up the residue between ethyl acetate and water; extracting out the aqueous layer, along with any insoluble matter at least once, preferably repeatedly with ethyl acetate and then (V) removing the solvent from the combined ethyl acetate phase; and (VI) digesting the residue with petroleum ether, whereby resajmaline is obtained on removal of the solvent from the petroleum ether extract, and ajmalexine is left undissolved in the form of a light cream colored powder.

Figure 3:
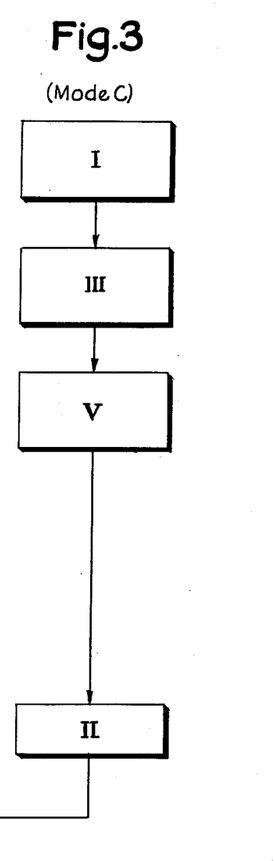
FIGURE 3 shows yet another mode (C) of carrying out the process according to the invention in practice.
Figure 4:
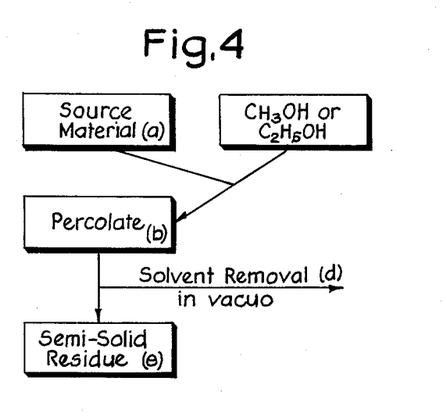
FIGURE 4 illustrates the initial stage (I) of all modes of carrying out the process according to the inveniton in practice.
Figure 5:
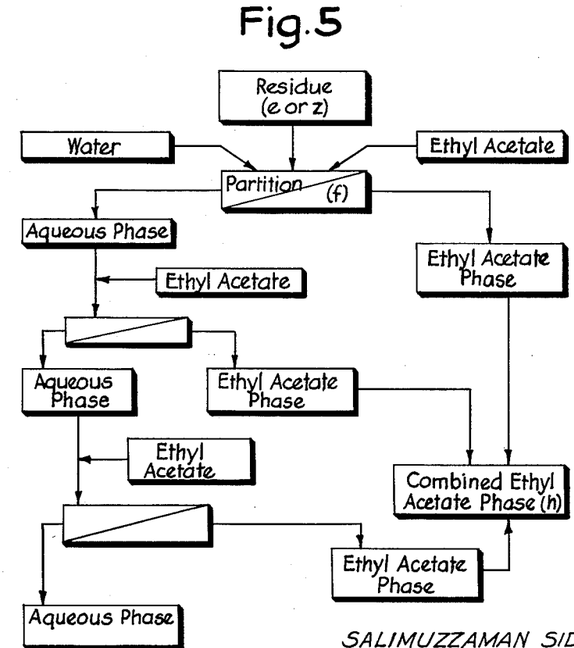
FIGURE 5 illustrates a stage (II) comprising a partition between water and a substantially neutral solvent of the kind described in detail hereinafter.
Figure 6:
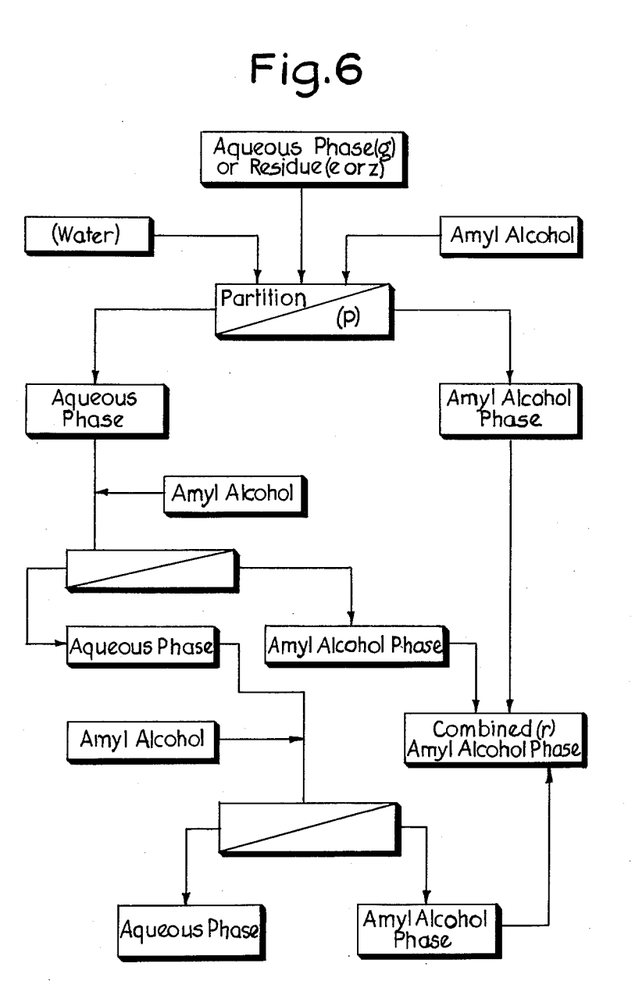
FIGURE 6 illustrates a stage (III) of the process according to the invention comprising a partition between water and a monohydroxylic alcohol and the formation of a combined alcoholic extract.

A third mode (C) of the process for isolating serpajmaline, illustrated in FIGURE 3, comprises the steps of (III) partitioning the residue, left after step (I), i.e. the removal of the solvent from the percolates of fresh undried chopped roots, between water and amyl alcohol and repeatedly extracting the aqueous layer with further quantities of amyl alcohol to exhaustion (V); removing ($d_5$) the solvent from the combined amyl alcohol extracts ($r$); (II) extracting the residue with water and ethyl acetate through simultaneous digestion with the two solvents whereby the ethyl acetate- and water-soluble fractions are obtained in two clear layers along with some insoluble matter; (V) removing the solvent from the combined ethyl acetate phase; and (VI) digesting the residue with petroleum ether, whereby resajmaline is obtained on removal of the solvent from the petroleum ether extract, and ajmalexine is left undissolved in the form of a light cream colored powder.

A second lot of the alkaloidal complexes is obtained by (V) removing the solvent from the amyl alcohol solution ($r$) left after extraction with water, and subjecting the residue ($z$) to the series of steps of group (II), described above in respect to the residue ($e$) left on removal of the solvent from the alcoholic percolates.

Alkaloidal complexes corresponding to resajmaline and ajmalexine may be similarly obtained from the other species of Rauwolfia.

The invention will be illustrated by the following non-limitative examples, the percentage yield of alkaloidal complexes being recorded on the weight of dried roots or root bark:

EXAMPLE I

(a) Isolation of Serpajmaline 16 kg. (kilograms) of fresh undried roots of *Rauwolfia serpentina*, Benth., corresponding in air-dry weight to 7.65 kg., were chopped into pieces of from 2 to 3 cm. lengths and soaked with ethanol in a percolator for 48 hours, whereafter the first percolate was drained out. After five similar operations a sample of the percolated roots assayed for only 0.3% alkaloids as against 1.3% in the original roots on air-dry weight basis in each case. The combined percolates were completely freed of the solvent in vacuo below 60° C. The resulting 400 g. (grams) of semi-solid residue were partitioned between one liter of water and 500 ccs. of ethyl acetate whereby the whole of it was divided up between these two phases without leaving any insoluble matter. The lower aqueous layer was repeatedly extracted with ethyl acetate (4.5 liter) till the ethyl acetate layer was found to extract only a negligible quantity of the material and had a slightly yellowish color. The aqueous layer was then repeatedly extracted with amyl alcohol (in all 6 liters) till further extractions were noted to yield only negligible quantities of residue on removal of the solvent from an aliquot fraction. The combined amyl alcoholic extract was then shaken out repeatedly with water (3 liters). The aqueous extracts on removal of the solvent in vacuo below 60° C. yielded a spongy residue which could be resolved into a light cream colored powder (95 g.). The amyl alcoholic solution left after exhaustion with water was freed of the solvent and the residue was subjected to the operations carried out on the semi-solid residue left on removal of the solvent from the alcoholic percolates, whereby a second lot of serpajmaline was obtained (20 g.), making for a total yield of 115 g. (1.5%).

(b) Separation of Resajmaline and Ajmalexine

The combined ethyl acetate extracts were freed of the solvent in vacuo and digested with petroleum ether till the petroleum ether did not extract any further quantity of the resulting light cream colored powder. The petroleum ether extracts gave, on removal of the solvent, resajmaline in a yield of 53 g. (0.7%); while the light cream colored powder, ajmalexine, formed 31 g. (0.4%).

EXAMPLE II 2.26 kg. of the bark scraped from the fresh undried roots of *Rauwolfia serpentina*, Benth. (corresponding to 750 g. dry weight) were percolated 8 times in the manner described in Example I with ethanol. The combined percolates were freed of the solvent and the residue (75 g.) subjected to the operations described in Example I when it finally yielded 17.3 g. (2.3%) serpajmaline, 9 g. (1.2%) resajmaline and 6.5 g. (0.87%) ajmalexine.

EXAMPLE III

In another working the residue left after removal of the solvent from the percolates of fresh undried chopped roots was partitioned between water and amyl alcohol, and the aqueous layer was repeatedly extracted with amyl alcohol. The amyl alcohol extracted was then freed of the solvent and the residue was repeatedly extracted with water and ethyl acetate through simultaneous digestion with the two solvents whereby the ethyl acetate- and water-soluble fractions were obtained in two clear layers along with some insoluble mattter. The aqueous solution together with the insoluble matter was extracted to exhaustion with amyl alcohol. The amyl alcohol extracts were then extracted out with water. The combined aqueous extracts on removal of the solvent in vacuo yielded serpajmaline. The amyl alcohol solution left after extraction with water was freed of the solvent and the residue was subjected to the operations carried out on the semi-solid residue left on removal of the solvent from the alcoholic percolates, whereby a second lot of serpajmaline was obtained. The other alkaloidal complexes were obtained after the manner described in Example I. The yields from 2 kg. of fresh material (corresponding to 700 g. on dry weight basis) were 9.8 g. (1.4%) of serpajmaline, 4.8 g. (0.68%) of resajmaline, and 2.8 g. (0.4%) of ajmalexine.

EXAMPLE IV 20 g. of the residue left on removal of the solvent from the alcoholic extract of the fresh roots was divided up between amyl alcohol and water. The aqueous layer was repeatedly extracted with further quantities of amyl alcohol to exhaustion. The combined amyl alcohol extracts were repeatedly extracted with water. The aqueous extracts were freed of the solvent to yield the first lot of serpajmaline. The amyl alcohol fraction left after extraction with water was freed of the solvent. Working up the residue after the manner described in Example I gave a second lot of serpajmaline making a total yield of 5.7 g. (1.5%), and the other two alkaloidal complexes: resajmaline, 2.7 g. (0.7%); and ajmalexine, 1.6 g. (0.4%).

EXAMPLE V 1.25 kg. of freshly collected roots were dried in a current of air at about 60° C., powdered and sifted through a 30 mesh sieve. The powder (600 g.) was percolated 8 times with ethanol at room temperature. The combined percolates were freed of the solvent and the residue (60 g.) subjected to the operations described in Example I when it finally yielded 10.0 g. (1.67%) of serpajmaline, 2 g. (0.33%) of resajmaline and 1.6 g. (0.27%) of ajmalexine. In this case some quantity of a reddish brown resinous matter was left undissolved in both water and ethyl acetate which was neglected in subsequent working.

In all above-described examples the treatment was carried out at room temperature, unless stated otherwise, and the pH value of the various extracts remained unadjusted.

It will be observed from the above examples, that, while the yield of serpajmaline from the roots dried under controlled conditions is about the same as from the fresh undried roots, the yields of resajmaline and ajmalexine, which will form the source material for reserpine and other weaker bases, are reduced to about half in the dried roots. In the case of roots carelessly dried, often with the development of fungus growth in the process of drying, it stands to reason that the position is further adversely affected, and the isolation procedure greatly complicated.

It will be understood that this invention is susceptible to further modification and, accordingly, it is desired to comprehend such modifications within this invention as may fall within the scope of the appended claims.

This application is a continuation-in-part application of application 669,448, filed July 2, 1957, now abandoned.

What I claim is:

1. A process for the isolation of certain alkaloidal complexes from *Rauwolfia serpentina,* Benth., comprising
   (1) the steps of percolating a source material from said Rauwolfia plant with an alcohol selected from the group consisting of methanol and ethanol and removing the alcohol from the resulting percolate to obtain a first semi-solid residue;
   (2) partitioning at least once the first semi-solid residue between water and a water-immiscible organic solvent selected from the group consisting of acetates of lower alcohols with 2 to 5 carbon atoms per molecule, thereby obtaining an organic and an aqueous phase;
   (3) separating the organic phase from step (2) and removing the solvent and any residual water from the organic phase by distillation under vacuum at a temperature up to 60° C. to obtain a second residue;
   (4) digesting the second residue with petroleum ether and separating the petroleum ether solution, thereby obtaining as a third solid residue a petroleum-ether insoluble residue an alkaloidal complex named ajmalexine and being a concentrate of the weaker bases with about 5.5% of reserpine and about 2.2% of rescinnamine and being a light cream colored powder soluble in ethyl acetate, largely soluble in benzene, and fairly soluble in ethanol and methanol; which complex after drying at 30° C. over $P_2O_5$ phosphorus pentoxide for 3 hours shrinks and turns brown at 72° C., froths up at 110° C. and melts at 118°–120° C.;
   (5) removing the solvent from the petroleum ether solution, thereby obtaining an alkaloidal complex named resajmaline and being a greenish viscous oily liquid having a kinematic viscosity of 4000 centistokes at 31.5° C., soluble in ethyl acetate, ether and petroleum ether and fairly soluble in ethanol and methanol which complex contains lipoids, serposterol and unsaturated higher alcohols as well as about 2.5% of reserpine, and about 0.5% of rescinnamine.

2. A process for the isolation of certain alkaloidal complexes from *Rauwolfia serpentina,* Benth., comprising
   (1) the steps of percolating a source material from said Rauwolfia plant with an alcohol selected from the group consisting of methanol and ethanol and removing the alcohol from the resulting percolate to obtain a first semi solid residue;
   (2) partitioning at least once the first semi-solid residue between water and a water-immiscible organic solvent selected from the group consisting of acetates of lower alcohols with 2 to 5 carbon atoms per molecule, thereby obtaining an organic and an aqueous phase;
   (3) separating the organic phase from step (2), removing any solvent and residual water from said phase resulting from (2) by distillation under vacuum at a temperature up to 60° C. to obtain a second residue;
   (4) digesting the resulting residue with petroleum ether and separating the dissolved phase from the residue, thereby obtaining as insoluble third residue an alkaloidal complex named ajmalexine and being a concentrate of the weaker bases with about 5.5% of reserpine and about 2.2% of rescinnamine and being a light cream colored powder soluble in ethyl acetate, largely soluble in benzene, and fairly soluble in ethanol and methanol which complex after drying at 30° C. over phosphorus pentoxide for 3 hours shrinks and turns brown at 72° C., froths up at 110° C. and melts at 118°–120° C.;
   (5) removing the solvent from the petroleum ether solution, thereby obtaining an alkaloidal complex named resajmaline and being a greenish viscous oily liquid having a kinematic viscosity of 4000 centistokes at 31.5° C., soluble in ethyl acetate, ether and petroleum ether and fairly soluble in ethanol and methanol which complex contains lipoids, serposterol and unsaturated higher alcohols as well as about 2.5% of reserpine, and about 0.5% of rescinnamine;

(6) extracting the aqueous phase resulting from (2) at least once with monohydroxylic alcohol having from 4 to 6 carbon atoms per molecule;

(7) separating the alcoholic phase resulting from (6) from the water phase;

(8) removing the alcohol from the alcoholic phase resulting from (6) by distillation under vacuum at a temperature up to 60° C., and repeating the steps of (2) through (4) described above, thereby obtaining a second lot of said alkaloidal complexes.

3. A process as claimed in claim 1, characterized in that the source material consists of fresh undried root parts of said Rauwolfia plant.

4. A process as claimed in claim 1, characterized in that the source material consists of parts of roots of said Rauwolfia plant, which root parts have been dried at a temperature of up to 60° C. in a current of air.

5. A process as claimed in claim 1, characterized in that the source material consists of parts of roots of said Rauwolfia plant, which root parts have been dried at a temperature of up to 60° C. in a current of an inert gas selected from the group consisting of nitrogen and carbon dioxide.

6. A process for the isolation of certain alkaloidal complexes from *Rauwolfia serpentina*, Benth., comprising (1) the steps of percolating a source material from said Rauwolfia plant with ethanol and removing the alcohol from the resulting percolate to obtain a first semi-solid residue;

(2) partitioning the first semi-solid residue between water and ethyl acetate to obtain an organic phase and an aqueous phase and then separating the aqueous phase from the organic phase;

(3) removing the ethyl acetate from the organic phase resulting from (2) by distillation under vacuum at a temperature up to 60° C. to obtain a second residue;

(4) digesting the second residue with petroleum ether and separating the dissolved phase from the residue, thereby obtaining as a third insoluble residue an alkaloidal complex named ajmalexine and being a concentrate of the weaker bases with about 5.5% of reserpine and about 2.2% of rescinnamine and being a light cream colored powder soluble in ethyl acetate, largely soluble in benzene, and fairly soluble in ethanol and methanol which complex after drying at 30° C. over phosphorus pentoxide for 3 hours shrinks and turns brown at 72° C., froths up at 110° C. and melts at 118°–120° C.; and removing the solvent from the petroleum ether solution, thereby obtaining an alkaloidal complex named resajmaline and being a greenish viscous liquid having a kinematic viscosity of 4000 centistokes at 31.5° C. soluble in ethyl acetate, ether and petroleum ether and fairly soluble in enthanol and methanol which complex contains lipoids, serposterol and unsaturated higher alcohols as well as about 2.5% of reserpine, and about 0.5% of rescinnamine;

(5) extracting the aqueous phase resulting from (2) at least once with amyl alcohol;

(6) extracting the alcoholic phase resulting from (5) with water to obtain an organic phase and an aqueous phase, and then separating said phases;

(7) removing the alcohol from the alcoholic phase resulting from (6) by distillation under vacuum at a temperature up to 60° C. to obtain a fourth residue, then treating it as a first residue by repeating the steps of (2) to (4) described above, thereby obtaining a second lot of said alkaloidal complexes.

7. A process as described in claim 6, characterized in that fresh undried root parts are used as the source material.

8. A process as described in claim 6, further comprising the step of treating the resulting ajmalexine with dilute aqueous solution of alkaline pH, so as to obtain an acid-soluble cream-colored powder being a basic component of serpajmaline.

9. A process as described in claim 6, further comprising the step of treating the resulting ajmalexine with an aqueous solution of ammonia containing 10% by weight of $NH_3$, and separating the resulting basic component of ajmalexine.

10. A process for the isolation of certain alkaloidal complexes from *Rauwolfia serpentina*, Benth., comprising first the group of steps (A) of percolating a source material from Rauwolfia plant with an alcohol selected from the group consisting of methanol and ethanol and removing the alcohol from the resulting percolate in vacuo to obtain a first residue;

(B) partitioning the first residue resulting from (A) at least once between water and a monohydroxylic alcohol having from 4 to 6 carbon atoms per molecule to obtain an alcohol phase and an aqueous phase, then separating said aqueous phase;

(C) separating the alcohol from the alcohol phase to obtain a second residue;

(D) extracting the resulting second residue with water and ethyl acetate through simultaneous digestion with the two solvents whereby the ethyl acetate- and water-soluble fractions are obtained in two clearly separated phases along with some insoluble matter;

(E) removing the solvent from the resultant ethyl acetate extraction phase to obtain a third residue;

(F) digesting the resulting third residue with petroleum ether to obtain a petroleum ether liquid phase and an insoluble fourth residue;

(G) separating the solution in petroleum ether from the insoluble fourth residue which residue constitutes an alkaloidal complex named ajmalexine, and being a concentrate of the weaker bases with about 5.5% of reserpine and about 2.2% of rescinnamine and being a light cream colored powder soluble in ethyl acetate, largely soluble in benzene, and fairly soluble in ethanol and methanol which complex after drying at 30° C. over phosphorus pentoxide for 3 hours shrinks and turns brown at 72° C., froths up at 110° C. and melts at 118°–120° C.; and removing the solvent from the petroleum ether solution in vacuo, thereby obtaining a second alkaloidal complex, named resajmaline, and being a greenish viscous oily liquid having a kinematic viscosity of 4000 centistokes at 31.5° C. soluble in ethyl acetate, ether and petroleum ether and fairly soluble in ethanol and methanol which complex contains lipoids, serposterol and unsaturated higher alcohols as well as about 2.5% of reserpine, and about 0.5% of rescinnamine.

References Cited in the file of this patent

UNITED STATES PATENTS 2,752,351    Schlittler               June 26, 1956
2,870,140    Thompson             Jan. 20, 1959

OTHER REFERENCES

Siddiqui et al.: J. Indian Chem. Soc., vol. 8, p. 667 (1937).

Klohs: J. Am. Chem. Soc., vol. 76, pp. 1332–4 (1954).

Willaman et al.: Economic Botany, vol. 9, No. 2 (1955), pages 142–143.

Willaman et al.: Amer. Jour. of Pharmacy, vol. 129 (1957), pages 251–253, 255 and 256.